(12) United States Patent  (10) Patent No.: US 8,784,111 B2
Feygin et al.  (45) Date of Patent: Jul. 22, 2014

(54) VASCULAR ACCESS SIMULATION SYSTEM WITH RECEIVER FOR AN END EFFECTOR

(75) Inventors: David Feygin, Glen Rock, NJ (US); Chih-Hao Ho, Reston, VA (US)

(73) Assignee: Laerdal Medical AS (NO)

( * ) Notice: Subject to any disclaimer, the term of this patent is extended or adjusted under 35 U.S.C. 154(b) by 766 days.

(21) Appl. No.: 12/606,724

(22) Filed: Oct. 27, 2009

(65) Prior Publication Data

US 2010/0047753 A1  Feb. 25, 2010

Related U.S. Application Data

(63) Continuation of application No. 10/807,047, filed on Mar. 23, 2004, now abandoned.

(51) Int. Cl.
*G09B 23/28* (2006.01)

(52) U.S. Cl.
USPC ........................................................ 434/262

(58) Field of Classification Search
USPC ........................................................ 434/262
See application file for complete search history.

(56) References Cited

U.S. PATENT DOCUMENTS

| 6,470,302 | B1 * | 10/2002 | Cunningham et al. | 703/7 |
| 6,654,000 | B2 * | 11/2003 | Rosenberg | 345/156 |
| 6,705,871 | B1 * | 3/2004 | Bevirt et al. | 434/262 |
| 2005/0084833 | A1 * | 4/2005 | Lacey et al. | 434/262 |

* cited by examiner

*Primary Examiner* — Kesha Frisby
(74) *Attorney, Agent, or Firm* — Kaplan Breyer Schwarz & Ottesen, LLP

(57) ABSTRACT

The illustrative embodiment is a simulation system for practicing vascular-access procedures without using human subjects. The simulator includes a data-processing system and a haptics interface device. The haptics device provides the physical interface at which an end effector (e.g., medical instrument, such as a needle, catheter, etc.) is manipulated to simulate needle insertion, etc. In accordance with the illustrative embodiment, the haptics device includes a receiver. The receiver receives the end effector when it's inserted by a user into the haptics device. Sensors that are associated with the receiver monitor the motion and position of the end effector, generate signals indicative thereof, and transmit the signals to the data processing system. The signals are processed to determine the effects of manipulation of the end effector. In some embodiments, the signals are processed to determine the various resistive forces that would arise if the user were manipulating a needle/catheter through actual human anatomy. Responsive to this determination, the receiver generates forces that the user experiences as a resistance to continued advance (insertion) of the end effector. Simulated results are displayed by the computer system.

22 Claims, 9 Drawing Sheets

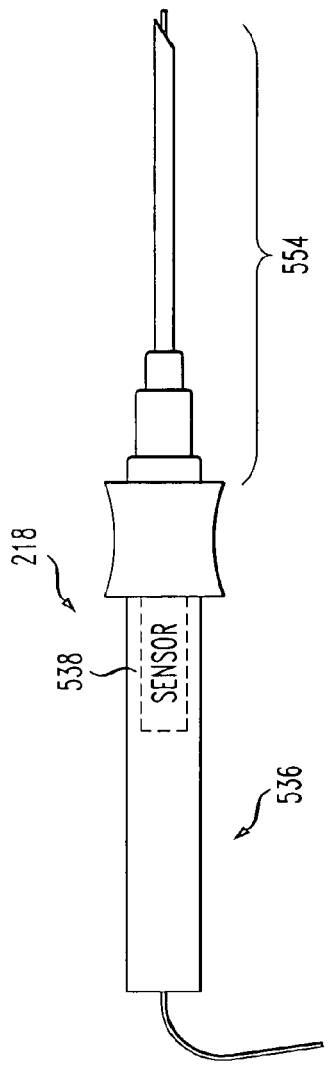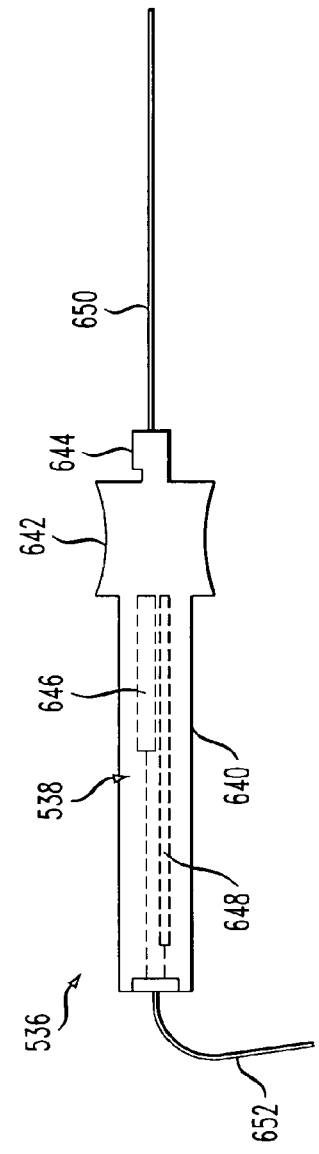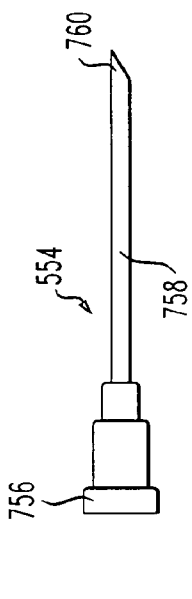
FIG. 5
FIG. 6
FIG. 7

VASCULAR ACCESS SIMULATION SYSTEM WITH RECEIVER FOR AN END EFFECTOR

STATEMENT OF RELATED CASES

This case is a continuation of U.S. patent application Ser. No. 10/807,047 filed Mar. 23, 2004. This case is related to U.S. patent application Ser. No. 10/807,017, Ser. No. 10/866,531, Ser. No. 10/802,016, and Ser. No. 10/882,348, all of which are incorporated by reference herein.

FIELD OF THE INVENTION

The present invention relates generally to systems that simulate medical procedures for the purposes of training or accreditation. More particularly, the present invention relates to a system, apparatus and subsystems for simulating vascular-access procedures.

BACKGROUND OF THE INVENTION

Medical practitioners, such as military medics, civilian emergency-medical personnel, nurses, and physicians, routinely perform vascular-access procedures (e.g., IV insertion, central venous-line placement, peripherally-inserted central catheter, etc). It is desirable for a practitioner to be proficient at performing these procedures since the proficient practitioner is far less likely to injure a patient and is almost certain to reduce the patient's level of discomfort.

Becoming proficient in vascular-access procedures requires practice. In fact, the certification and re-certification requirements of some states mandate a minimal number of needle sticks, etc., per year per provider. Historically, medical practitioners practiced needle-based procedures on live volunteers. More recently, simulation techniques and devices have been developed to provide training in vascular-access procedures without the use of live volunteers. U.S. Pat. No. 6,470,302 ("the '302 patent") surveys the art of medical-simulation devices and also discloses a vascular-access simulation system.

The vascular-access simulation system that is disclosed in the '302 patent includes an "interface" device and a computer system. To practice a vascular-access procedure, a user manipulates an "instrument," referred to in the patent as a "catheter unit assembly," which extends from the device and serves as a catheter-needle. Potentiometers and encoders within the interface device track the motion and position of the instrument and relay this information to the computer system. The computer system performs a simulation of the surface and subsurface anatomy of human skin, and determines the effect of the instrument's motion on the skin's anatomy. Simulated results are displayed by the computer system. Using the motion information from the interface device, the computer system also generates a control signal that controls a force-feedback system that is coupled to the instrument. The force-feedback system generates various resistive or reactive forces that are intended to simulate the forces that are experienced by a medical practitioner during an actual vascular-access procedure. The user senses these forces during manipulation of the instrument.

The simulation system that is disclosed in the '302 patent has many shortcomings that substantially limit its utility as a training or accreditation tool. A few of these shortcomings are discussed below.

One shortcoming of that simulation system is that forces that are sensed by a user during manipulation of the catheter unit assembly are generally unrealistic. There are several reasons for this. One reason is that the linear axis along which the catheter unit assembly moves is offset from the rotational axes of a sensing/force-feedback assembly to which it's coupled. This results in an unrealistic torque sensation about the "insertion point" of the catheter unit assembly. A second reason for the unrealistic forces and force sensations that are experienced by a user is excessive friction. Specifically, the various tension members and bearings that couple the catheter unit assembly to the sensing/force-feedback assembly introduce a substantial amount of dynamic and static friction to the system. This is problematic because the interface device cannot present a force that is less than the friction that is inherent in the system. This excessive friction therefore limits the dynamic range of the system. Also, the presence of static friction (i.e., stiction) in the device hampers smooth motion of the catheter unit assembly. Stiction is not experienced during an actual vascular-access procedure.

A third reason for the unrealistic forces that are experienced during use of the device that is disclosed in the '302 patent is that the device has relatively high inertia. In particular, the large catheter unit assembly and the offset pulley used in the force-feedback mechanism introduce substantial mass into the system. This is undesirable because the catheter unit assembly will not feel as "light" as it should when little or no force feedback is being applied.

A second shortcoming of the '302 is that the end effector (i.e., the catheter unit assembly) is permanently coupled to the force-feedback system. Although not atypical for this type of system (i.e., haptics devices) due to the difficulty of de-coupling an end effector from its force-feedback system, this is very undesirable because to truly mimic most "actual" systems, de-coupling is necessary.

For example, in the case of an actual vascular-access procedure, a medical practitioner experiences "force-feedback" during insertion of a needle or catheter (i.e., an end effector) into a patient's arm. That is, the anatomy of the arm presents a resistance that is sensed (feedback) by the practitioner. In the actual procedure, the needle or catheter is not, of course, "coupled" to the arm until it is inserted by the practitioner. But in the system that is disclosed in the '302 patent, the catheter unit assembly is coupled to the force-feedback system and extends from interface device at all times. A user, therefore, does not actually insert the catheter unit assembly (i.e., the end effector); there is no coupling and de-coupling.

The inability of prior-art vascular-access simulation systems to realistically simulate a vascular-access procedure limits their usefulness as a training or accreditation tool.

SUMMARY

The illustrative embodiment of the present invention is a simulation system that provides realistic training and practice for performing vascular-access procedures without using human subjects. Unlike most prior-art simulation systems, some embodiments of the present system provide a realistic simulation of the resistive forces that a medical practitioner would experience if the simulated procedure were an actual procedure that was being performed on a real anatomy (e.g., human arm, etc.). Furthermore, in accordance with the illustrative embodiment of the present invention, the end effector (e.g., medical instrument, such as a needle, catheter, etc.) is not coupled to a force-feedback system until a user does so.

The illustrative embodiment of a vascular-access simulator includes a data-processing system and an interface device, referred to herein as a "haptics device." The haptics device provides the physical interface for performing vascular-access procedures. More particularly, a user inserts an end effector into the haptics device and manipulates it to simulate needle insertion, cannulation, etc. In some embodiments, the simulator is capable of sensing the orientation of the end effector. For example, in some embodiments in which the end effector is a needle or catheter or both, the simulator is capable of sensing the orientation of a beveled end of the needle or catheter.

In accordance with the illustrative embodiment, the haptics device includes a receiver that receives the end effector when it is inserted into the haptics device. In some embodiments in which the end effector is a needle-catheter module, the receiver is a needle-stick module.

In some embodiments, the needle-stick module provides one linear degree of freedom and two, independent, rotational degrees of freedom (i.e., pitch and yaw). In the illustrative embodiment, the linear degree of freedom enables a user to advance the needle/catheter module into the haptics device. This mimics the insertion of a needle/catheter into a patient's arm. The rotational degrees of freedom enable a user to move an engaged needle/catheter module up or down and left or right. This mimics the freedom of movement that a user has during an actual vascular-access procedure.

Sensors within the haptics device monitor the motion and position of the needle/catheter module (e.g., by measuring the insertion depth and pitch and yaw angles of the needle-stick module, etc.). The sensors generate signals indicative of the monitored activity and transmit the signals to the data processing system.

The data processing system processes the information acquired by the sensors and, in conjunction with an anatomical model, determines the effects (e.g., deformation, entry into a vein, etc.) of a user's manipulation of the needle/catheter module on the surface and subsurface features of the virtual body part on which the simulated vascular-access procedure is being performed. Results are displayed by the computer system. The results include, for example, a three-dimensional rendering of the body part of interest, a visual indication of the position of the needle/catheter relative to the body part, and a visual indication of how the needle/catheter affects that body part.

Furthermore, in some embodiments, using the anatomical model and the information obtained from the sensors, the data processing system determines the various resistive forces that would arise if the user were manipulating a needle or catheter through an actual anatomy (e.g., human arm, etc.). Based on this determination, the data processing system or an associated device generates a control signal.

The control signal is ultimately received by the needle-stick module and, responsive thereto, the needle-stick module provides "force feedback" to a user. The force-feedback is sensed by a user as a resistance to continued advance (insertion) of the needle/catheter module. The resistance is intended to simulate penetration or contact with various surface and subsurface features of human anatomy (e.g., the skin, a vein, harder structures such as ligaments, bones, etc.) The resistance advantageously varies with insertion depth and the pitch and yaw of the needle/catheter module (since the resistance is determined based on the estimated position of needle/catheter module in a portion of the human anatomy).

As previously mentioned, it is typical, although undesirable, for an end effector to be permanently coupled to a force-feedback system. In accordance with the illustrative embodiment of the present invention, the needle/catheter module (i.e., an end effector) is not coupled to the needle-stick module (which includes a force-feedback assembly) until a user couples them during a simulated vascular-access procedure. And when the simulated procedure is over, the user decouples the needle/catheter module from the needle-stick module. A user's interactions with simulators described herein therefore more closely simulate a real vascular-access procedure than simulators in the prior art. This more realistic simulation is expected to result in a more useful training experience.

BRIEF DESCRIPTION OF THE DRAWINGS

FIG. 5 depicts an illustrative embodiment of the needle/catheter module.

FIG. 6 depicts the pseudo needle of the module depicted in FIG. 5.

FIG. 7 depicts the pseudo catheter of the module depicted in FIG. 5.

DETAILED DESCRIPTION

The terms and phrases listed below are defined for use in this specification as follows:

"End Effector" means a device, tool or instrument for performing a task. The structure of an end effector depends on the intended task. For example, in the illustrative embodiment, the end effector is intended to be used to simulate a vascular access procedure, and is therefore implemented as a catheter-needle module. Those skilled in the art will recognize that term "end effector" is borrowed from robotics, where it has a somewhat different definition: a device or tool connected to the end of a robot arm.

"Imitation" means an artificial likeness that is intended to be substantially similar to an item being imitated; a copy. For example, "imitation skin," which is used in conjunction with the illustrative embodiment of the present invention, is intended to mimic or copy genuine skin via appropriate selection of color, appearance, feel, and overall presentation.

"Mock" means "representative;" a stand-in for a genuine article, but not intended to closely imitate the genuine article. A mock article will never be confused with the genuine article and typically does not promote a suspension of disbelief that the mock article is the genuine article. For example, "mock skin" is not intended to mimic genuine skin, and typically departs from it in terms of color, appearance, feel or overall presentation.

"Pseudo" is an inclusive term that means "imitation" or "mock." For example, pseudo skin is meant to encompass both imitation skin and mock skin.

"Skin" means genuine skin.

Additional definitions are provided later in this Detailed Description.

This Detailed Description continues with an overview of a vascular-access simulator in accordance with the illustrative embodiment. Following the overview, specific embodiments of several elements of the simulator are described in greater detail.

Overview

Figure 1:
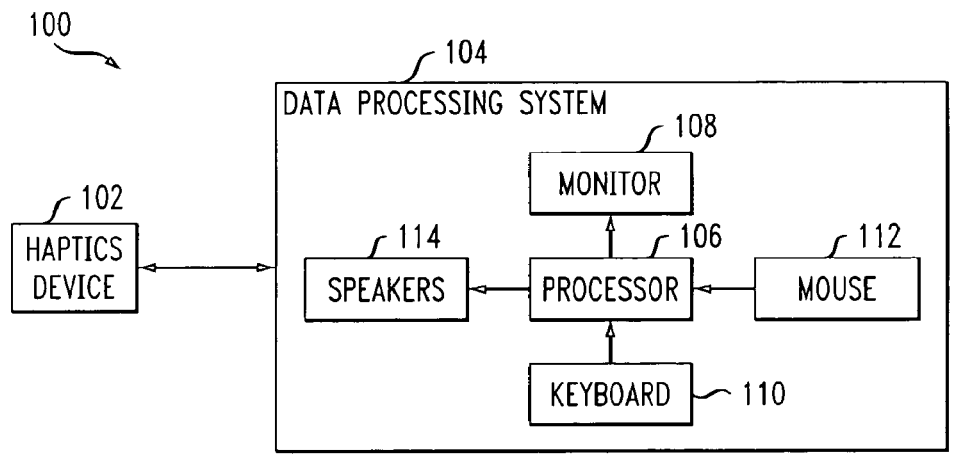
FIG. 1 depicts vascular-access simulation system 100 in accordance with the illustrative embodiment of the present invention.

The illustrative embodiment of the present invention pertains to a simulation system that provides realistic training and practice for vascular-access procedures without using human subjects. As depicted in FIG. 1, vascular-access simulator 100 includes haptics device 102 and data-processing system 104.

Haptics device 102 provides the physical interface for performing any of several simulated vascular-access procedures (e.g., intravenous catherization, central venous-line placement, sternal intraosseous insertion, etc.).

The term "haptics" (as in "haptics device 102") relates to touch (i.e., the sense of touch). A fundamental function of haptics device 102, and indeed any haptics interface, is to create a means for communication between users (i.e., humans) and machines. This "communication" is possible since humans are capable of "mechanically" interfacing with their surroundings due, at least in part, to a sense of touch. This "sense of touch" includes sensations of pressure, texture, puncture, thermal properties, softness, wetness, friction-induced phenomena, adhesions, etc. Furthermore, humans also experience vibro-tactile sensations, which include the perception of oscillating objects in contact with the skin and kinesthetic perceptions (i.e., awareness of one's body state, including position, velocity, and forces supplied by the muscles). As will become clear later in this Detailed Description, our ability to perceive a variety of these sensations is exploited by haptics device 102.

To the extent that some embodiments of simulator 100 are intended for use as a practice and training tool, it is advantageous for haptics device 102 to simulate vascular-access procedures as realistically as possible and provide a quantitative measure of the user's performance of the simulated procedure. To this end, haptics device 102 possesses one or more of the following attributes, in addition to any others:

- It possesses sufficient degrees-of-freedom to simulate the relatively free movement of a needle/catheter during an actual vascular-access procedure.
- It offers the opportunity to perform all steps of a vascular-access procedure, including, for example, needle insertion, skin interactions (e.g., palpation, skin stretch, etc.), catheter threading, etc.
- It generates appropriate skin- and venous-puncture forces.
- It measures or otherwise quantifies the effects of user actions on simulated anatomy.
- It generates appropriate haptic feedback (i.e., feel) during skin-interaction steps.
- It is configured to provide ergonomically-correct hand position during simulated vascular-access procedures.
- It is small enough so that it can be positioned in front of a computer monitor so that the haptics device and the monitor are inline with a user's forward-looking field of view.
- It is at least subtly suggestive of human anatomy and does not present any substantial departures therefrom so as to support a user's ability to suspend disbelief during a simulated vascular-access procedure.

Data-processing system 104, which includes processor 106, monitor 108, keyboard 110, mouse 112, and speakers 114, supports the visual aspects of the simulation and other functions described below. Processor 106 is a general-purpose processor that is capable of receiving and processing signals from haptics device 102, running software for the visual portion of the vascular-access simulation including an anatomy simulator, running calibration software for calibrating the various sensing elements used in haptics device 102, and sending control signals to haptics device 102 to support closed-loop force feedback, among other capabilities. Processor 106 comprises memory, in which the software described above is stored. In the illustrative embodiment, processor 106 is a personal computer.

Monitor 108 displays a rendering that is generated by processor 106, in conjunction with the above-referenced software. The rendering, which in some embodiments is three-dimensional, is of a region of the body (e.g., isolated arm, thorax, neck, etc.) on which a simulated vascular-access procedure is being performed. The rendering advantageously depicts visual aspects such as, without limitation, the anatomical structures that underlie skin, local deformation of the skin in response to simulated contact, and tracking of a "virtual" instrument (e.g., a needle, etc.) through anatomical structures that underlie the skin.

Figure 2:
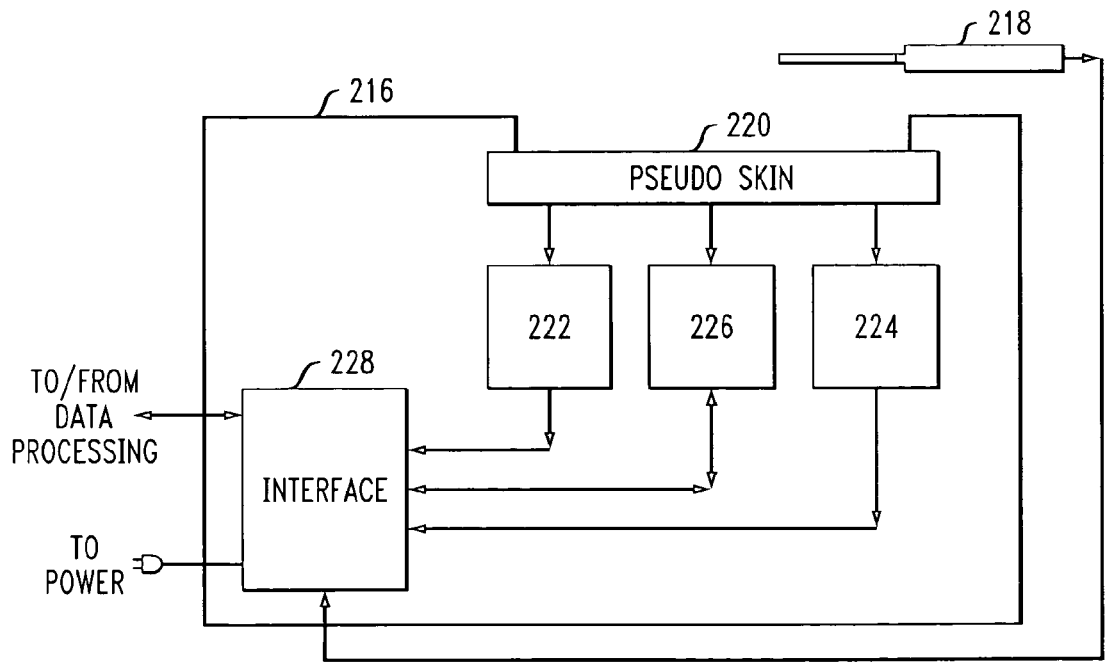
FIG. 2 depicts functional elements of haptics device 102, which is a part of vascular-access simulation system 100.

Haptics device 102 is now described in further detail. For pedagogical purposes, haptics device 102 is depicted in FIG. 2 as comprising several functional modules or elements. These include:

End effector or Needle/catheter module 218;
Pseudo skin 220;
Palpation module 222;
Skin-stretch module 224;
Receiver or Needle-stick module 226; and
Electronics/communications interface 228.

The functional elements of haptics device 102 listed above that relate to human anatomical features or are otherwise intended to generate resistive forces that would be sensed when penetrating such anatomical features (elements 222-228) are advantageously contained within housing 216 or otherwise located "underneath" pseudo skin 220. In an actual vascular-access procedure, the needle or catheter, of course, remains outside of the body until inserted during the procedure. Likewise, in accordance with the illustrative embodiment, the end effector—needle/catheter module 218—remains outside of housing 216 and pseudo skin 220 until a portion of it is inserted during a simulated vascular-access procedure. In some embodiments, housing 216 is subtly shaped like a portion of a human arm, yet is nondescript enough to avoid creating a discontinuity between what is seen and what is felt.

Pseudo skin 220 is a membrane that is used in conjunction with the simulation of skin-interaction techniques, such as palpation, occlusion, and skin stretch techniques. Pseudo skin 220 is advantageously, but not necessarily, imitation skin (i.e., skin-like in appearance). In embodiments in which pseudo skin 220 is imitation skin, it possesses any one of a number of natural flesh tones. In some embodiments, pseudo skin 220 is at least somewhat resilient to enable a user to perform skin-interaction techniques. In some embodiments, pseudo skin 220 comprises a thermoplastic elastomer such as Cawiton®, which is available from Wittenburg, B.V., Hoevelaken, Netherlands. The use of imitation skin, as opposed to mock skin, is desirable because it helps a user to "suspend disbelief," which contributes to making simulator 100 more useful as a training tool.

Figure 3:
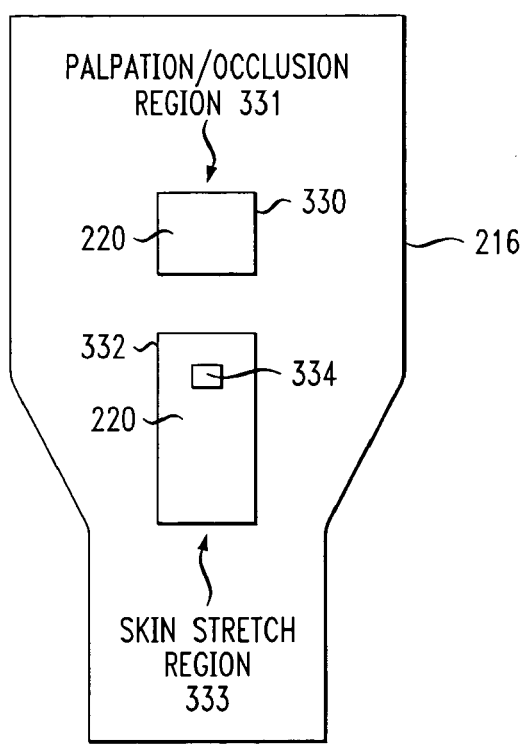
FIG. 3 depicts a top view of haptics device 102.

As depicted in FIG. 3, pseudo skin 220 is accessed for insertion and skin-interaction techniques (e.g., palpation, occlusion, skin stretch, etc.) through openings 330 and 332 in housing 216. Opening 330 defines palpation/occlusion region 331 (i.e., the site at which palpation and occlusion techniques are performed) and opening 332 defines skin-stretch region 333 (i.e., the site at which the skin-stretch technique is performed) and includes insertion point 334 for the end effector (e.g., needle/catheter module 218).

The ability to perform skin-interaction techniques provides a more realistic simulation of vascular-access procedures. In some embodiments, this ability is provided in conjunction with palpation module 222 and skin-stretch module 224. These modules, and illustrative embodiments thereof, are described in further detail applicant's co-pending U.S. patent application Ser. No. 10/807,017.

Pseudo skin 220 is disposed adjacent to the inside surface of housing 216 so that it appears to be nearly co-extensive (i.e., co-planar) with housing 216 at openings 330 and 332. This is intended to create a subtle suggestion that the surface of housing 216 is "skin" at regions other than where pseudo-skin 220 is accessed for skin-interaction techniques. Consistent with human anatomy, the remaining functional elements of haptics device 102 (elements 222-228), with the exception of needle/catheter module 218, are "hidden" beneath pseudo skin 220.

The end effector (e.g., needle/catheter module 218, etc.) is inserted into haptics device 102 at insertion point 334 in opening 332. In some embodiments, simulator 100 is capable of sensing orientation of the end effector, such as to determine the orientation of a feature of a needle or catheter. In some embodiments, the feature is a bevel. This is an important aspect of the real insertion technique, since proper bevel orientation reduces a patient's discomfort during needle/catheter insertion. In some embodiments, needle/catheter module 218 is configured to be very similar to a real needle and catheter.

Once inserted into haptics device 102, the tip of needle/catheter module 218 engages receiver 226, which, for the illustrative embodiment of a vascular access simulator, is referred to as a "needle-stick module." Needle-stick module 226 supports the continued "insertion" of the needle/catheter module 218. In particular, in some embodiments, needle-stick module 226 is configured to provide one linear degree of freedom and two rotational degrees of freedom (i.e., pitch and yaw). The linear degree of freedom provides a variable insertion depth, enabling a user to advance needle/catheter module 218 into the "patient's arm" (i.e., haptics device 102). The rotational degrees of freedom enable a user to move (an engaged) needle/catheter module 218 up or down and left or right. In some embodiments, needle-stick module 226 measures insertion depth, and pitch (up/down) and yaw (left/right) angles.

In some embodiments, needle-stick module 226 provides "force feedback" to a user, whereby the user senses a variable resistance during continued advance (insertion) of needle/catheter module 218. The resistance is intended to simulate penetration of the skin, a vein, and harder structures such as ligaments, bones, and the like. The resistance advantageously varies with insertion depth and the pitch and yaw of needle/catheter module 218, as described further below.

It will be understood that the "measurements" of angle, position, etc. that are obtained by the functional elements described above are obtained in conjunction with various sensors and data-processing system 104. In particular, most of the functional elements described above include one or more sensors. The sensors obtain readings from an associated functional element, wherein the readings are indicative of the rotation, displacement, etc., of some portion of the functional element. These readings provide, therefore, information concerning the manipulation of needle/catheter module 218 in addition to any parameters.

Each sensor generates a signal that is indicative of the reading, and transmits the signal to electronics/communications interface 228. Sensors used in some embodiments include, without limitation, potentiometers, encoders, and MEMS devices. Those skilled in the art will know how to use and appropriately select sensors as a function of their intended use in conjunction with the functional elements described above.

Electronics/communications interface 228 receives the signals transmitted by the various functional elements of haptics device 102 and transmits them, or other signals based on the original signals, to data-processing system 104. Furthermore, electronics/communications interface 228 distributes power to the various functional modules, as required.

As described later below, electronics/communications interface 228 also receives signals from data processing system 104 and transmits them to needle-stick module 226, among any other modules within haptics device 102, as part of a closed loop force-feedback system. In some embodiments, the signals received from data processing system 104 are amplified before they are transmitted to needle-stick module 226, etc. As an alternative to having electronics/communications interface 228 transmit the signals that are received from data processing system 104, in some embodiments, the electronics/communications interface generates new signals based on the received signals. This approach, which is typically referred to as embedded control, is well known in the art. It disadvantageously requires a substantial increase in processing power and data management (relative to simply transmitting the received signals, or simply amplifying the received signals) and is generally a less-preferred approach.

Data-processing system 104 receives the measurement data and, using the simulation software, calculates the forces that are being applied by the user during the skin-interaction procedures. Furthermore, using an anatomical model, data-processing system 104 calculates the position and angle of a virtual needle within a simulated anatomy (e.g., arm, etc.). Data-processing system 104 displays, on monitor 108, a rendering of the appropriate anatomy (e.g., arm, etc.) and displays and tracks the course of a virtual needle within this anatomy.

Furthermore, based on the position and course of the virtual needle (as calculated based on the position and orientation of needle/catheter module 218), data-processing system 104 generates control signals that are transmitted to needle-stick module 226. These control signals vary the resistive force presented by needle-stick module 226 to account for various anatomical structures (e.g., vein, tissue, tendons, bone, etc.) that needle/catheter module 218 encounters, based on the simulation. As a consequence, the resistance to continued needle/catheter insertion that is experienced by a user of simulator 100 is consistent with the resistance that would be sensed by a practitioner during an actual vascular access procedure.

Having completed the overview of vascular-access simulator 100 and haptics device 102, the end effector (in the illustrative embodiment needle/catheter module 218) and receiver (in the illustrative embodiment needle-stick module 226) will be described in further detail.

Figure 4A:
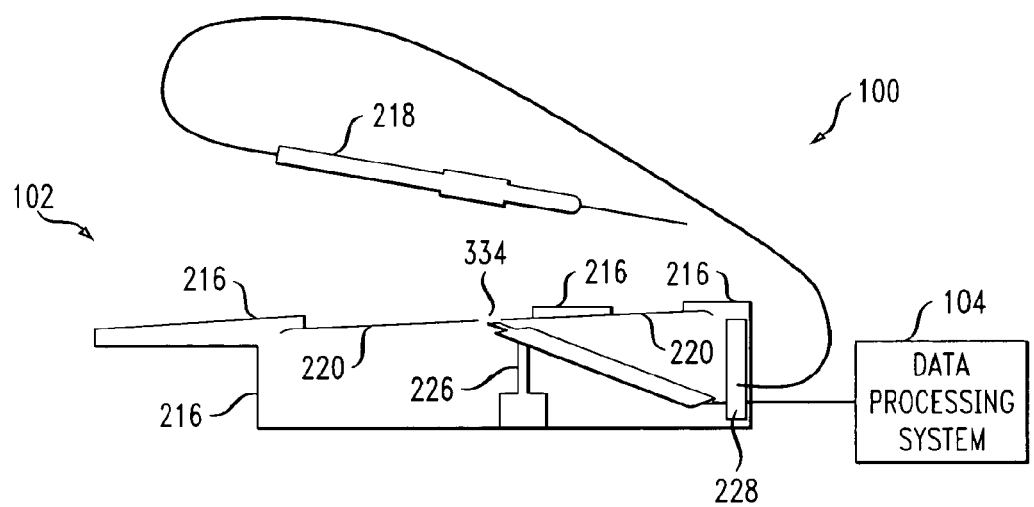
FIG. 4A depicts the salient elements of vascular-access simulation system 100, wherein the end effector is not yet inserted into a receiver within haptics device 102.
Figure 4B:
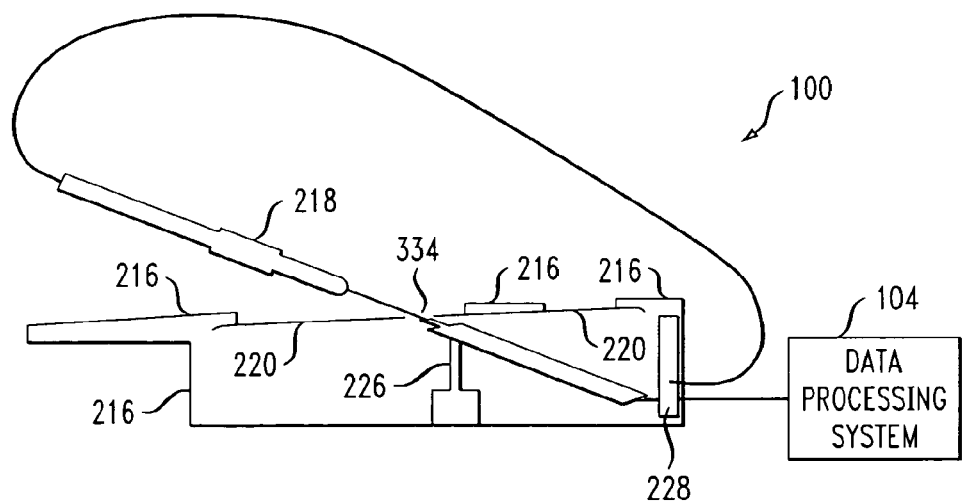
FIG. 4B depicts vascular-access simulation system 100 showing the end effector coupled to the receiver within haptics device 102.

FIGS. 4A and 4B depict haptics device 102 and data processing system 104 of simulator 100. In the embodiment depicted in these Figures, haptics device 102 includes needle/catheter module 218, needle-stick module 226 and electronics/communications interface 228. It will be appreciated that in other embodiments, other functional modules (such as those described previously) in addition to or instead of needle-stick module 226 and electronics/communications interface 228 are typically present within haptics device 102.

The needle-stick module and the electronics/communications interface are disposed within housing 216. Both needle/catheter module 218 and needle-stick module 226 are electronically coupled to electronics/communications interface 228, and through it coupled to data processing system 104. As previously described, electronics/communications interface 228 provides power to these and other modules, receives signals from these and other modules as well as data processing system 104, and sends signals to needle-stick module 226 and data processing system 104.

Needle-stick module 226 is disposed substantially beneath pseudo skin 220 and is accessible to needle/catheter module 218 via insertion point 334. In some embodiments, a portion (i.e., guide 1089, see ¶0086 and FIGS. 10A-10C) of needle-stick module 226 is raised slightly above the plane of pseudo skin 220 to simply the process of engaging needle/catheter module 218 to the needle-stick module. In the illustrative embodiment, insertion point 334 is an opening in pseudo skin 220. In some other embodiments, the needle/catheter module penetrates pseudo skin 220. FIG. 4A depicts the simulator before a user has inserted needle/catheter module 218 into needle-stick module 226. FIG. 4B depicts the simulator after a user has inserted the needle/catheter module into the needle-stick module.

FIGS. 5-7 depict an illustrative embodiment of needle/catheter module 218 and its constituent parts. In the illustrative embodiment, needle/catheter module includes needle portion 536 and catheter portion 554, which can be coupled to or decoupled from one another. FIG. 5 depicts the needle portion and catheter portion coupled to one another. FIG. 6 depicts only needle portion 536 and FIG. 7 depicts only catheter portion 554. When needle portion 536 is coupled to catheter portion 554, needle 650 (FIG. 6) is received by catheter 758 (FIG. 7).

As depicted in FIG. 5, needle/catheter module 218 includes sensor 538. In the illustrative embodiment, sensor 538 is disposed in needle portion 536. In some embodiments, sensor 538 provides data that is indicative of the orientation of the bevel, such as bevel 760 of catheter portion 554 (see, FIG. 7). Those skilled in the art will know how to select and use a device to function as sensor 538. In some embodiments, sensor 538 is one or more micro-electromechanical system (MEMS) devices. As is well known in the art, MEMS devices typically have a size within a range of about 100 nanometers to a millimeter, and are created using surface micro-machining techniques (e.g., depositing mechanical and sacrificial layers, selectively etching to pattern, etc.)

In the illustrative embodiment that is depicted in FIG. 6, needle portion 536 includes needle housing 640, needle 650, and wire 652. Housing 640 includes surface features such as ergonomic grip 642 and ridge 644. Needle portion 536 and catheter portion 554 are configured for locking engagement, such as by inserting ridge 644 into a complementary slot (not depicted) in coupler 756 of catheter 554.

Needle housing 640 contains sensor 538, which in the illustrative embodiment depicted in FIG. 6 comprises two MEMS accelerometers 646 and 648. The accelerometers are electrically coupled to wire 652, which is, in turn, coupled to electrical/communications interface 228. The accelerometers are oriented orthogonal to one another so that they detect motion along orthogonal axes. Each of accelerometers 646 and 648 is capable of generating a signal that is indicative of motion along two orthogonal axes. It is notable that while MEMS accelerometers 646 and 648 can detect motion along two orthogonal axes, this is not necessary for resolving the orientation of, for example, the bevel. This can be done by detecting motion along only one axis. This information obtained by the accelerometers is ultimately transmitted to data processing system 104 and used by it to resolve the orientation of housing 640 or anything rigidly coupled to it (such as catheter portion 554) in two dimensions. MEMS accelerometers suitable for use as sensor 538 include, for example, dual-axis accelerometers with duty cycle output, such as model ADXL202E available from Analog Devices, Inc. of Norwood, Mass.

In the illustrative embodiment, needle portion 536 is connected via wire to electrical/communications interface 228. But in some other embodiments, needle-catheter module 218 is a wireless device. In these other embodiments, needle portion 536 communicates wirelessly with either electrical/communications interface 228 or (directly) with data processing system 104. In such embodiments, needle portion 536, electrical/communications interface 228, and data processing system 104 include a transceiver, receiver, or transmitter, as appropriate. In embodiments in which needle/catheter module 218 operates wirelessly, it advantageously includes its own power source, such as one or more lithium-ion batteries, etc. Those skilled in the art will know how to make and use embodiments of the present invention in which needle/catheter module 218 is configured for wireless operation.

In the illustrative embodiment, bevel 760 is formed on catheter 758. Those skilled in the art of vascular-access techniques will recognize that in an authentic instrument (i.e., authentic needle and catheter) the bevel is typically formed in the needle rather than the catheter. Bevel 760 is formed on catheter 758, rather than needle 650, as a preferred location in view of other design decisions (in particular, the manner in which needle 650 is coupled to needle-stick module 226, which is described in detail later in this specification). In other embodiments, the bevel is formed on needle 650. In such other embodiments, it will be advantageous to suitably modify the way in which needle 650 couples to needle-stick module 226.

Figure 8:
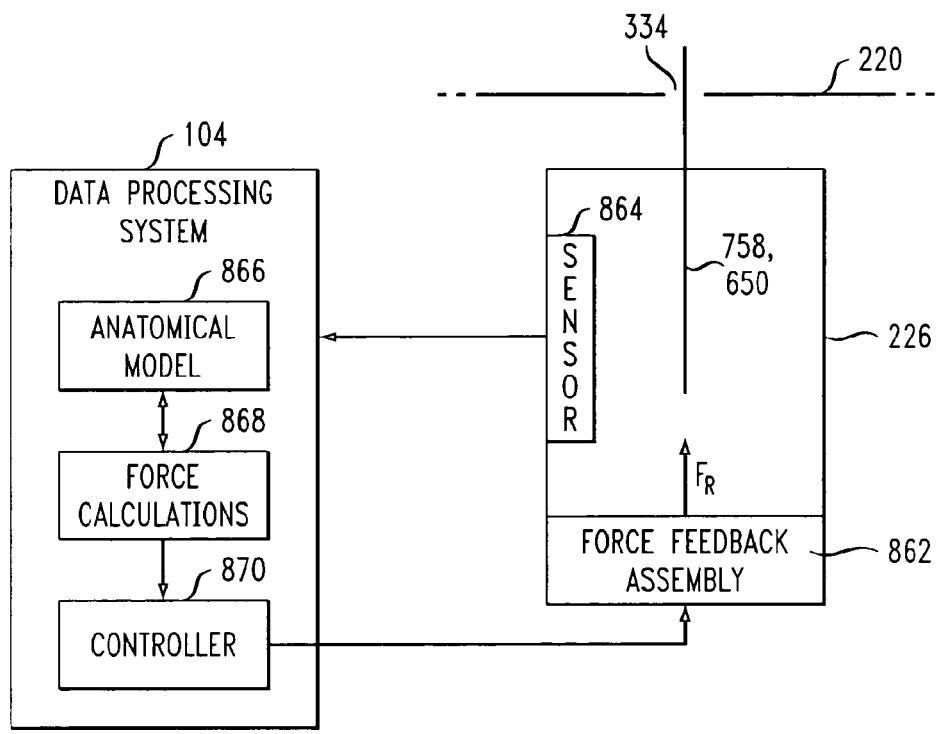
FIG. 8 depicts an embodiment of vascular-access simulation system 100 wherein said system includes a data processing system, pseudo skin, an end effector, and a receiver having a sensor and a force-feedback system.

FIG. 8 depicts further detail of an illustrative embodiment of needle-stick module 226. In this embodiment, needle-stick module includes force-feedback assembly 862 and sensor 864. In FIG. 8, needle 650 or catheter 758 is shown "penetrating" pseudo skin 220 at insertion point 334 and is received by needle-stick module 226.

Sensor 864, which can be one or more sensors, senses the position of needle 650/catheter 758. In some embodiments, sensor(s) 864 obtains information indicative of the extent of penetration of the needle/catheter into needle-stick module 226. In some other embodiments, sensor(s) 864 also measures the orientation of the needle/catheter, assuming that needle/catheter module 218 is free to move in other directions. In other words, sensor(s) 864 monitor movement along axes that align with one or more available degrees of freedom.

Sensor(s) 864 generates signal(s) indicative of the monitored movement. The sensor(s) are directly or indirectly coupled to data processing system 104. The signals, or other signals derived therefrom, are transmitted from sensor(s) 864 and are ultimately received by data processing system 104. Using the data contained in the signal(s), and in conjunction with anatomical model 866 and force-calculation software 868, the data processing system:
- determines the anatomical features that the needle/catheter would encounter (skin, vein, ligaments, bone, etc.), based on its position, were it moving through an actual anatomy; and
- calculates the resistive forces that would arise as the needle/catheter encounters these various anatomical features.

A control signal(s) is generated by controller 870 based on the force calculations. The control signal(s) is transmitted to haptics device 102 and is ultimately received by force-feedback assembly 862.

Responsive to the control signal(s), force-feedback assembly 862 generates force $F_R$ that opposes movement of the needle/catheter. In some embodiments, force $F_R$ only opposes "forward" movement (i.e., movement in the direction of continued insertion) of the needle/catheter through needle-stick module 226. In some other embodiments, forces are generated that oppose movement of the needle/catheter both in the forward and reverse direction (i.e., insertion and removal).

Figure 9:
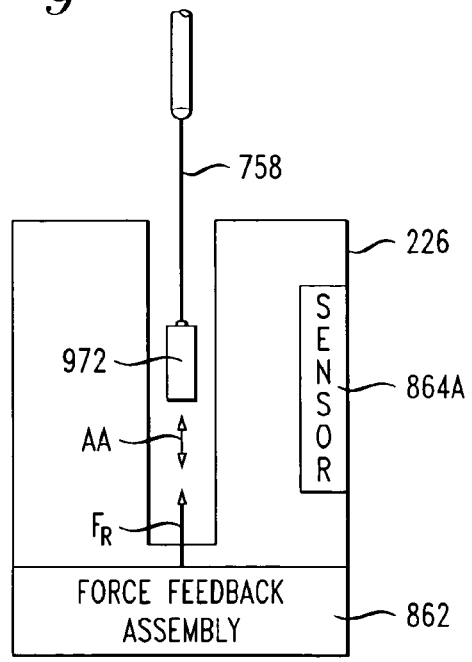
FIG. 9 depicts the needle/catheter module coupled to a movable member in the receiver.

FIG. 9 depicts further detail of an embodiment of needle-stick module 226. In the embodiment that is depicted in FIG. 9, needle-stick module 226 includes movable member 972. When needle/catheter module 218 is inserted into haptics device 102, needle 650 or catheter 758 couples to movable member 972. The movable member is capable of moving forward or backward along translational axis A-A; for example, as a user manipulates needle/catheter module 218 into or out of haptics device 102. In some embodiments, sensor 864A monitors translational motion of movable member 972 and, hence, the translational motion of needle/catheter module 218.

It is desirable for movable member 972 to move with very low friction. In some embodiments, this is implemented via an arrangement that provides "rolling contact." In other words, to the extent that movable member 972 contacts a surface, the contact involves a rolling member (e.g., pulleys against a cable, ball bearings against a surface, etc.) Rolling contact is to be distinguished, for example, from sliding contact, the latter typically associated with greater friction.

Figure 10A:
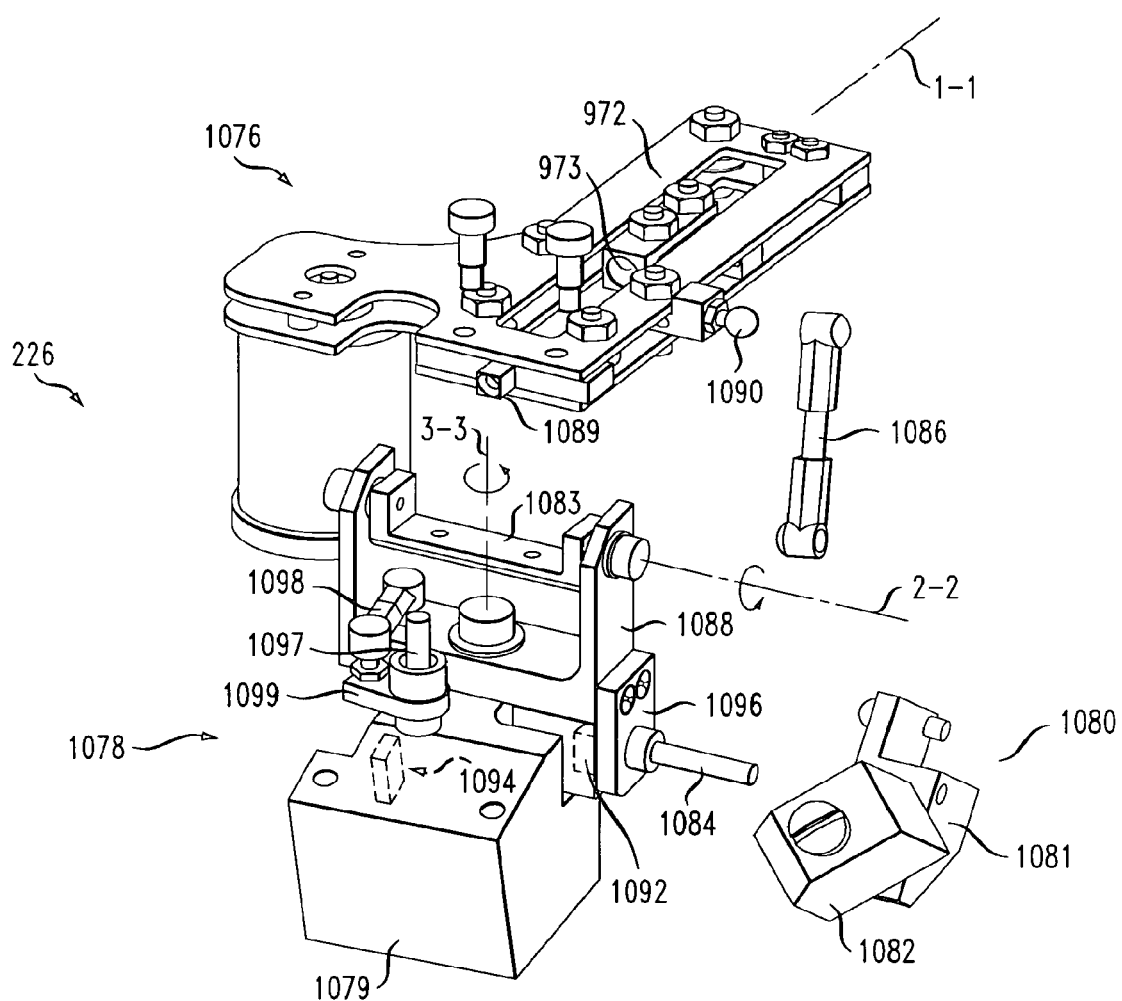
FIGS. 10A-10C depict an illustrative embodiment of the needle-stick module, including a receiving module.
Figure 10B:
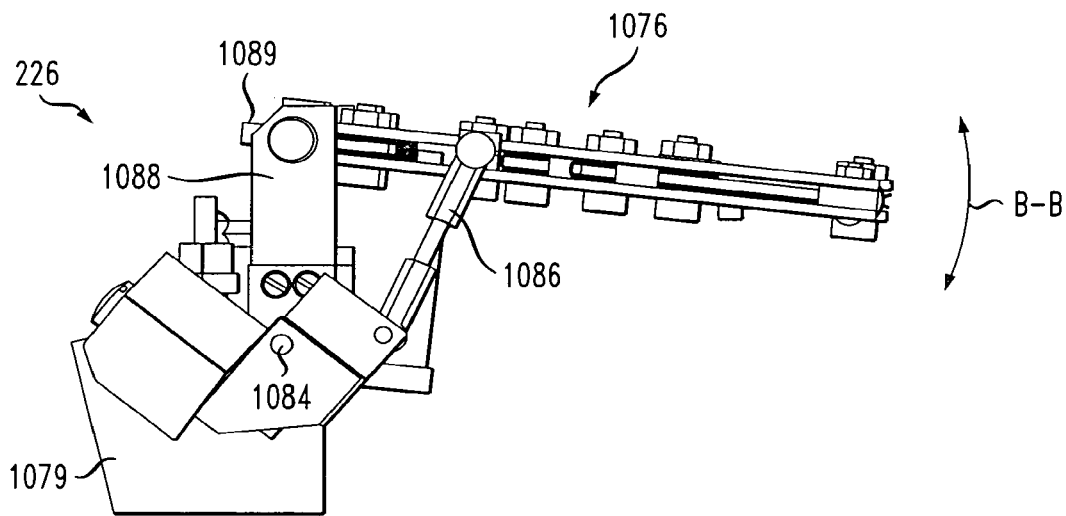
Figure 10C:
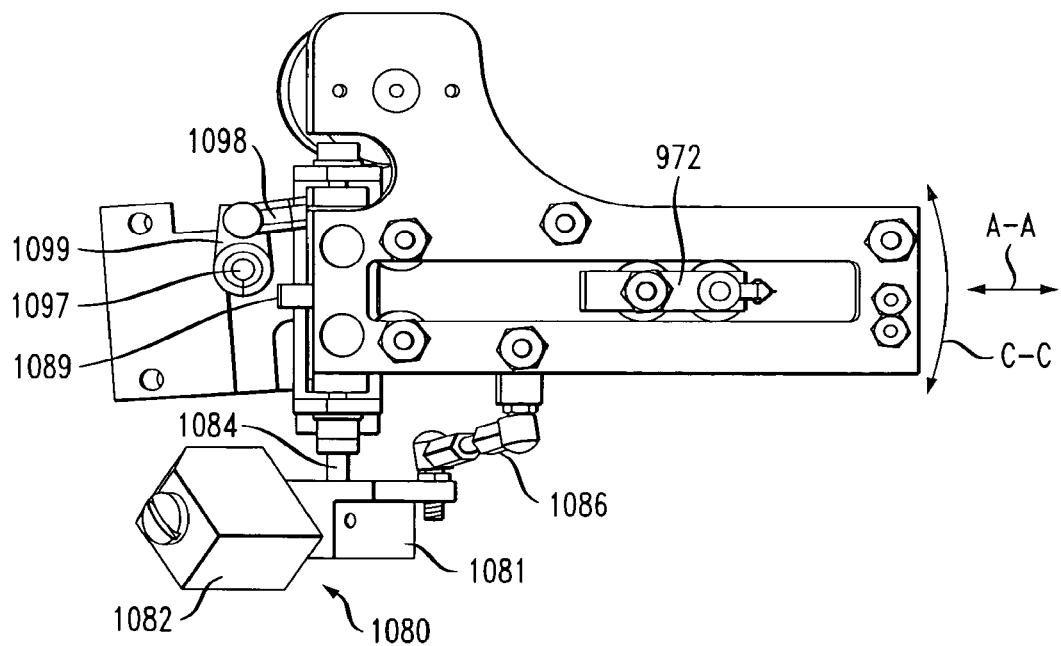
Figure 11A:
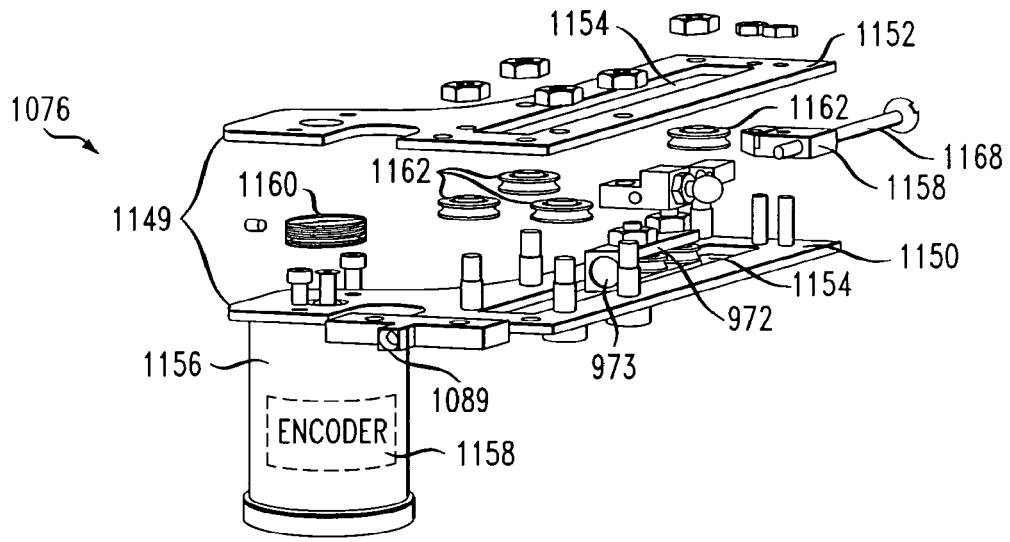
FIGS. 11A-11D depict further detail of the receiving module.
Figure 11B:
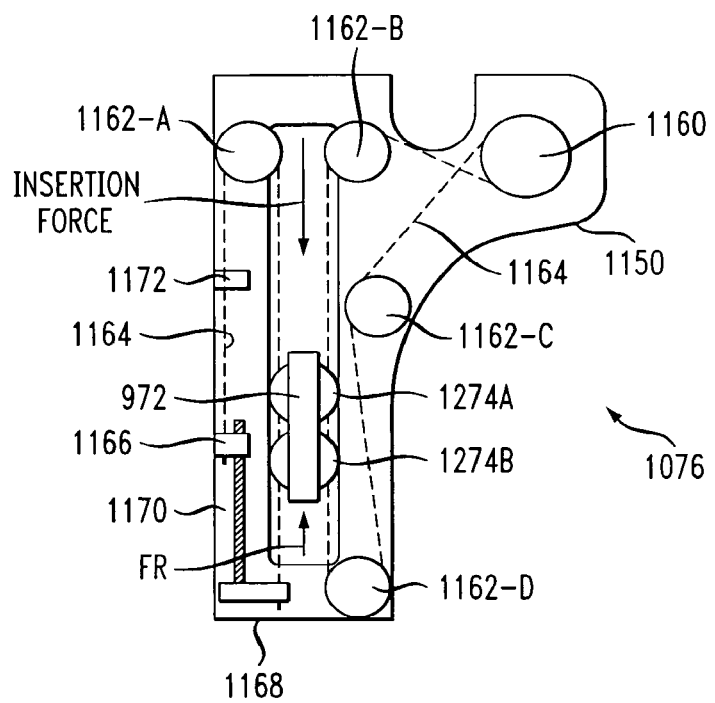
Figure 11C:
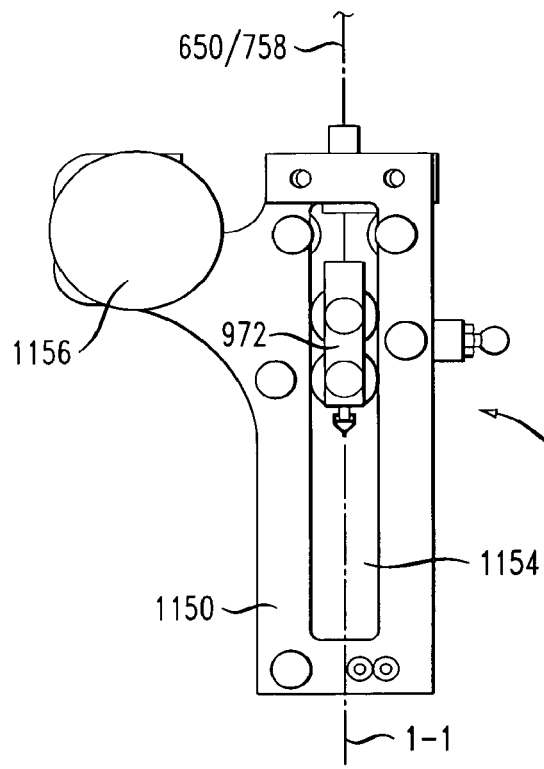
Figure 11D:
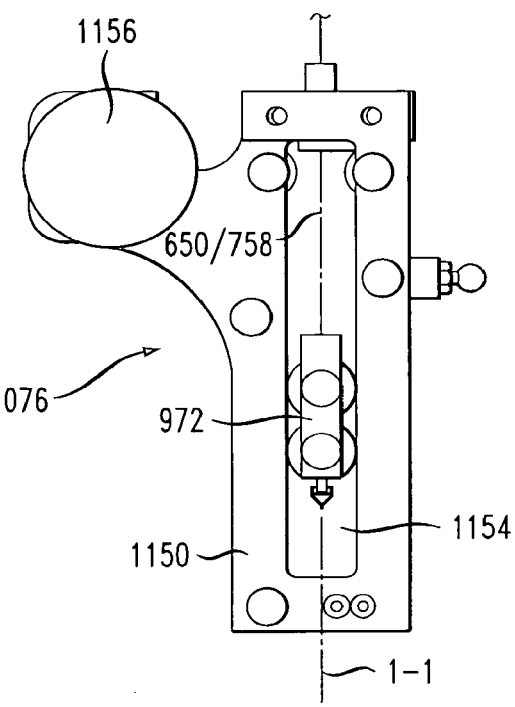
Figure 12:
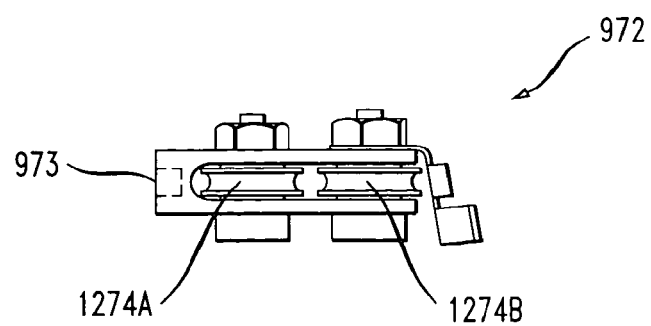
FIG. 12 depicts an embodiment of the movable member.

FIGS. 10A-10C, 11A-11D and 12 depict an embodiment of needle-stick module 226. In particular, FIGS. 10A-10C depict an embodiment of needle-stick module 226 via exploded view (FIG. 10A), side view (FIG. 10B) and top view (FIG. 10C). FIGS. 11A-11D depict an illustrative embodiment of receiving module 1076, which includes force-feedback assembly 862 and movable member 972. And FIG. 12 depicts an illustrative embodiment of movable member 972.

Referring now to the exploded view depicted in FIG. 10A, needle-stick module 226 comprises receiving module 1076, base and gimbal assembly 1078, and counterweight assembly 1080. Receiving module 1076 couples to secondary-gimbal bracket 1083, counterweight holder 1081 rigidly couples to pitch potentiometer shaft 1084, and link 1086 couples, at one end, to receiving module 1076 (via to ball-joint ball 1090) and at the other end to counterweight holder 1081 (see also, FIGS. 10B, 10C). Base 1079 of needle-stick module 226 is disposed on the bottom inside surface of housing 216 in the manner depicted in FIGS. 4A and 4B.

The illustrative embodiment of needle-stick module 226 provides three degrees of freedom—one translational and two rotational—as follows. Movable member 972 moves within receiving module 1076 along translational axis 1-1. This provides the "translational" degree of freedom. (See also, FIG. 10C, translational movement is movement in the directions indicated by path A-A.) Secondary gimbal bracket 1083 and receiving module 1076 rotate about pitch axis 2-2. (See also, FIG. 10B, pitch is movement in the directions indicated by path B-B.) Primary-gimbal bracket 1088 and receiving module 1076 rotate about yaw axis 3-3. (See also, FIG. 10C, yaw is movement in the directions indicated by path C-C.) Rotation about the pitch and yaw axes provide the two "rotational" degrees of freedom of needle-stick module 226.

In the illustrative embodiment, pitch and yaw of receiving module 1076 are tracked by potentiometers. More particularly, pitch is evaluated using pitch potentiometer 1092 and yaw is evaluated using yaw potentiometer 1094, as described further below. Potentiometers 1092 and 1094 are, therefore, specific embodiments of generic sensor(s) 864 of FIG. 8.

With continuing reference to FIG. 10A, pitch potentiometer 1092 is coupled to the obscured side of potentiometer holding plate 1096. As receiving module 1076 swings up or down (i.e., pitches), link 1086 forces counterweight holder 1081 to rotate about an axis that aligns with pitch potentiometer shaft 1084 (see also, FIG. 10B). Since counterweight holder 1081 is rigidly attached to potentiometer shaft 1084, that shaft turns as the counterweight holder rotates. Rotation of the potentiometer shaft and, hence, pitching of receiving module 1076 is therefore "sensed" by pitch potentiometer 1092. Pitch potentiometer 1092 is electrically coupled to electronics/communications interface 228 (not depicted in FIG. 10A, see, e.g., FIGS. 4A and 4B). Pitch potentiometer 1092 generates a signal indicative of the sensed movement and transmits it to electronics/communications interface 228 and, through it, to data processing system 104. It is notable that since counterweight 1082 moves along with counterweight holder 1081, the weight of receiving module 1076 is counterbalanced through its full range of motion.

Still referring to FIG. 10A, yaw potentiometer 1094 is disposed beneath yaw potentiometer shaft 1097 and is coupled to an obscured surface of base 1079. Primary-gimbal bracket 1088 is mechanically coupled to yaw potentiometer shaft 1097 by links 1098 and 1099 (see also, FIG. 10C). Yaw potentiometer shaft 1097 is coupled to yaw potentiometer 1094 in known fashion. Rotation of yaw potentiometer shaft 1097 and, hence, yawing of receiving module 1076 is therefore "sensed" by yaw potentiometer 1094. The yaw potentiometer is electrically coupled to electronics/communications interface 228 (not depicted in FIG. 10A, see, e.g., FIGS. 4A and 4B). Yaw potentiometer 1094 generates a signal indicative of the sensed movement and transmits it to electronics/communications interface 228 and, through it, to data processing system 104. Potentiometers suitable for use as potentiometers 1092 and 1094 are commercially available from Clarostat Sensors and Controls, Inc. of El Paso, Tex., among others.

In use, the catheter and or needle of needle-catheter module 218 is inserted into guide 1089. Once inserted into guide 1089, the tip of the catheter or needle and movable member 972 couple to one another. In the illustrative embodiment, magnet 973 is disposed at the forward end of movable member 972 (see, FIGS. 10A and 12). The magnet is used as a means to readily and reversibly couple the tip of needle 650 or catheter 758 to movable member 972.

It was previously disclosed that in some embodiments, movable member 972 is coupled to a force-feedback system, referred to earlier as force-feedback assembly 862. As previously described, force-feedback assembly 862 generates a resistance to continued insertion of needle-catheter module 218 into receiving module 1076. An illustrative embodiment of force-feedback assembly 862 and additional description of receiving module 1076 is now provided in conjunction with FIGS. 11A-11D.

FIG. 11A depicts an exploded view of an embodiment of receiving module 1076. In the illustrative embodiment, receiving module 1076 includes frame 1149, which comprises lower plate 1150 and upper plate 1152. The receiving module also includes movable member 972 and force-feedback assembly 862, which comprises motor 1156, motor encoder 1158, motor pulley 1160, pulleys 1162, and cable 1164 (shown in FIG. 11D only).

Movable member 972 is disposed between upper and lower plates 1150 and 1152 and is positioned between centrally-located openings 1154 in the plates. Referring to FIG. 11B, movable member 972 is suspended at pulleys 1274A and 1274B (see also, FIG. 12) by cable 1164, which is depicted as a dashed line for clarity. Cable 1164 is fixed at one end by holder 1166 and fixed at the other end by holder 1168. Holders 1166 and 1168 are coupled to one another by tensioning screw 1170, which adjusts the tension in cable 1164. Cable 1164 is supported at a variety of intermediate locations by pulleys 1162 (i.e., 1162A-1162D). The cable also wraps around motor pulley 1160, thereby coupling movable member 972 to motor 1156.

FIGS. 11C and 11D depict a bottom view of receiving module 1076. These Figures depicts sequential "snap shots," wherein needle 650/catheter 758 is inserted deeper into receiving module 1076 (e.g., by a user practicing a vascular-access technique with needle/catheter module 218, etc.). Since the needle/catheter is coupled to movable member 972 (e.g., by magnet 973, etc.), the movable member is also moved "deeper" into receiving module 1076. Indeed, once coupled, any movement of needle/catheter module 218 causes movable member 972 to advance or retreat along axis 1-1 within region 1154 of plates 1150 and 1152.

As described above, motor 1156 is coupled to movable member 972 via cable 1164 (FIG. 11B). Any movement of the movable member therefore causes the motor to move. For example, as movable member 972 moves forward or "deeper" into receiving module 1076, motor pulley 1160 turns in a clockwise direction (for the particular arrangement depicted in FIG. 11B). Movement of the motor pulley causes the motor to turn and this movement is captured by encoder 1158 (FIG. 11A) in known fashion. As a consequence, translational motion of movable member 972, and, therefore, the position of needle/catheter module 218, is sensed by encoder 1158. The encoder is therefore an embodiment of sensor(s) 864 of FIG. 8. The encoder is electrically coupled to electronics/communications interface 228 (see, e.g., FIGS. 4A and 4B). Encoder 1158 generates a signal indicative of the movement of motor 1156 and transmits it to electronics/communications interface 228 and, through it, to data processing system 104.

In addition as functioning as a means for tracking the position of movable member 972 (and needle/catheter module 218), motor 1156 also functions as a key element of force-feedback assembly 862.

In particular, responsive to a control signal (e.g., generated by controller 870 of FIG. 8, etc.), which is based on calculations performed by data processing system 104, the motor engages with a specified amount of torque in a counterclockwise direction (for the particular arrangement depicted in FIG. 11B). This generates a force, $F_R$, which opposes or counters the force applied by a user during continued insertion of needle/catheter 218. As previously described, force $F_R$ is intended to simulate the resistance that would be presented by various anatomical features, were the simulated vascular-access procedure an actual procedure that was being performed on a real anatomy.

It is notable that in the arrangement that is depicted in FIG. 11B, the insertion force applied by a user is aligned with the tension in cable 1164 and with the translational degree of freedom. As a consequence, no unusual or unrealistic torque sensations are experienced by a user as needle/catheter module 218 is inserted into receiving module 1076.

A motor suitable for use in conjunction with the present invention is a coreless brushed DC motor, such as is commercially available from Maxon Precision Motors, Inc. of Fall River, Mass. In some embodiments, cable 1164 is made from stainless steel and the pulleys 1162 are nylon pulleys. In such embodiments, the force-feedback assembly has very low inertia, very low friction, and is very stiff. As will be appreciated by those skilled in the art, these are all attributes of a good haptics design.

It is to be understood that the above-described embodiments are merely illustrative of the present invention and that many variations of the above-described embodiments can be devised by those skilled in the art without departing from the scope of the invention. For example, in this specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Furthermore, the particular features, structures, materials, or characteristics can be combined in any suitable manner in one or more embodiments. It is therefore intended that such variations be included within the scope of the following claims and their equivalents.

We claim:

1. An apparatus for simulating a medical technique, wherein the apparatus comprises:
   a housing;
   pseudo skin, wherein the pseudo skin covers a portion of housing and includes an insertion point;
   an end effector;
   a receiver structurally arranged to magnetically couple to the end effector as the end effector passes through the insertion point, wherein:
   (i) the receiver is structurally arranged to monitor translational movement of the end effector along one axis and rotational movements of the end effector about two axes, wherein all three of the axes intersect within the receiver; and
   (ii) the receiver, the end effector, and the pseudo skin are dimensioned and structurally arranged so that the simulation begins as the end effector passes through the insertion point, there being substantially no offset between the pseudo skin and a point at which the end effector operatively couples to the receiver such that translational movement and rotational movement of the end effector are monitored substantially immediately upon the end effector passing through the insertion point.

2. The apparatus of claim 1 wherein the end effector comprises a catheter.

3. The apparatus of claim 1 wherein the receiver comprises a movable member that is dimensioned and arranged to reversibly couple to the end effector.

4. The apparatus of claim 3 wherein the movable member is arranged so that it moves along a linear path in response to translational movement of the end effector when the end effector and the receiver are coupled.

5. The apparatus of claim 3 wherein the movable member is arranged to move via rolling contact.

6. The apparatus of claim 5 wherein the movable member comprises a pulley, and wherein the pulley provides the rolling contact.

7. The apparatus of claim 6 wherein the movable member is coupled to a cable and the cable is coupled to a motor, whereby translational movement of the movable member causes the motor to move.

8. The apparatus of claim 7 further comprising an encoder, wherein movement of the motor is captured by the encoder, the encoder thereby sensing translational motion of the movable member.

9. The apparatus of claim 3 wherein the movable member comprises a magnet, and wherein the end effector magnetically couples to the magnet.

10. The apparatus of claim 3 wherein the movable member is coupled to a force-feedback assembly that delivers force feedback to a user manipulating the end effector.

11. The apparatus of claim 10 wherein the force-feedback assembly comprises a motor, a plurality of pulleys and a cable.

12. The apparatus of claim 11 wherein the movable member couples to the cable.

13. The apparatus of claim 12 wherein the cable couples to the motor.

14. The apparatus of claim 13 wherein, responsive to a control signal, the motor generates a resistance to movement of the movable member.

15. The apparatus of claim 11 further comprising a frame, wherein the frame receives the movable member and the plurality of pulleys, and wherein the plurality of pulleys engage the cable, and further wherein the pulleys are arranged so that a tension in the cable aligns with a linear path along which the movable member moves.

16. An apparatus for simulating a medical technique, wherein the apparatus comprises:
   a housing;
   a pseudo skin, wherein the pseudo skin covers a portion of housing and wherein the pseudo skin includes an insertion point; and
   a receiver, wherein the receiver is disposed in the housing, wherein the receiver is structurally arranged to receive an end effector that is inserted through the insertion point and is further structurally arranged to begin simulating the medical technique substantially as soon as the end effector is inserted through the insertion point by monitoring translational movement and rotational movement of the end effector, wherein receiver includes:
   (i) a frame;
   (ii) an arrangement for providing two orthogonal axes of rotation for the frame, wherein the frame is coupled to the arrangement;
   (iii) a movable member, wherein:
   the end effector magnetically couples to the movable member as the end effector passes through the insertion point; the movable member moves along a linear path in a region defined by the frame; and the linear path and each of the two orthogonal axes of rotation intersect at a single point within the frame; and
   (iv) sensors for monitoring movement of the end effector about the two axes of rotation and for monitoring movement of the movable member along the linear path.

17. The apparatus of claim 16 further comprising a force-feedback assembly, wherein the force-feedback assembly is coupled to the movable member, and wherein the force-feedback assembly imparts a force that resists forward motion of the movable member by the end effector.

18. The apparatus of claim 17 wherein the force-feedback assembly comprises:
   a motor; and
   a cable, wherein the cable is coupled to the motor.

19. The apparatus of claim 18 wherein the movable member includes a rolling-contact element, wherein the cable is coupled to the rolling-contact element.

20. The apparatus of claim 16 further comprising a counterbalance, wherein the counterbalance is coupled to the frame.

21. The apparatus of claim 16 wherein the receiver is gravitationally balanced.

22. An apparatus for simulating a medical technique, wherein the apparatus comprises:
   pseudo skin, wherein the pseudo skin includes an insertion point;
   an end effector; and
   a receiver structurally arranged to couple to the end effector, wherein the receiver comprises:
   a receiving module having a movable member that magnetically couples to the end effector as the end effector passes through the insertion point, wherein the movable member is movable in linear fashion along a first axis;
   a base and gimbal assembly rotatably coupled to the receiving module and providing two orthogonal axes of rotation for the receiving module and wherein the first axis intersects the two axes of rotation at a single point;
   a sensor for monitoring movement of the movable member along the first axis; and
   a force feedback system for applying a variable force that opposes movement of the end effector based on sensed movement of the movable member, wherein the force feedback system comprises a cable that couples to the movable member.

* * * * *